(12) United States Patent
Banford

(10) Patent No.: US 9,083,691 B2
(45) Date of Patent: Jul. 14, 2015

(54) FINE-GRAINED USER AUTHENTICATION AND ACTIVITY TRACKING

(71) Applicant: Oracle International Corporation, Redwood Shores, CA (US)

(72) Inventor: Jeremy Evan Banford, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 106 days.

(21) Appl. No.: 13/837,040

(22) Filed: Mar. 15, 2013

(65) Prior Publication Data

US 2014/0082706 A1 Mar. 20, 2014

Related U.S. Application Data

(60) Provisional application No. 61/701,107, filed on Sep. 14, 2012.

(51) Int. Cl.
*G06F 21/00* (2013.01)
*H04L 29/06* (2006.01)
*H04L 29/08* (2006.01)

(52) U.S. Cl.
CPC .............. *H04L 63/08* (2013.01); *H04L 67/145* (2013.01)

(58) Field of Classification Search
CPC ................................ H04L 63/08; H04L 67/14
USPC ....................................... 726/5; 709/203, 209
See application file for complete search history.

(56) References Cited

U.S. PATENT DOCUMENTS

2009/0106433 A1* 4/2009 Knouse et al. ................ 709/229
2012/0296961 A1* 11/2012 Stanev et al. ................. 709/203

OTHER PUBLICATIONS

Ceccarelli, "Improving Security of Internet Services Through Continuous and Transparent User Identity Verification", 2012, IEEE, pp. 201-206.*

* cited by examiner

*Primary Examiner* — Taghi Arani
*Assistant Examiner* — Gregory Lane
(74) *Attorney, Agent, or Firm* — Kilpatrick Townsend & Stockton LLP

(57) ABSTRACT

In one embodiment, the finer grained control may be in the form of controlling the validity period after which credentials need to be provided anew or access is denied. In another embodiment, the control may be provided by enabling the period of inactivity after which access is denied to be controlled. In yet another embodiment, techniques may be provided for enabling isolation of applications for a session.

15 Claims, 6 Drawing Sheets

FINE-GRAINED USER AUTHENTICATION AND ACTIVITY TRACKING

CROSS-REFERENCES TO RELATED APPLICATIONS

This application claims priority to U.S. Provisional Application No. 61/701,107, filed Sep. 14, 2012, and entitled "Fine-Grained User Authentication and Activity Tracking," the disclosure of which is incorporated by reference herein for all purposes.

BACKGROUND OF THE INVENTION

The present disclosure relates to computer systems and software, and more particularly to access management techniques including web access management techniques.

Some applications, protected by deployment of a Web Access Management (WAM) product such as Oracle® Access Manager (OAM) provided by Oracle Corporation, are more sensitive in their access needs than others in the same deployment. For example, this could be defined on the axis of how authentication is performed (e.g., using a password versus a time-synchronous tokencode. Other examples of WAM products include CA SiteMinder®, Tivoli Access Manager provided by IBM, and ForgeRock OpenAM.

Many access management products can enforce more stringent timings on a per-application basis by using session state held in a cookie. However, due to the limited space available in which to hold state information, the data is not sufficiently rich to enable isolation. This can in fact have negative effects, for example, the response to seeing an idle session is to invalidate it completely, cutting off access to applications which, based on the timings define, would still allow it. Some other WAM products maintain multiple deployments of the WAM product. This provides some isolation but adds complexity in maintaining these environments.

BRIEF SUMMARY OF THE INVENTION

Certain embodiments of the present invention provide techniques that enable finer grained user authentication and activity control.

In one embodiment, the finer grained control may be in the form of controlling the validity period after which credentials need to be provided anew or access is denied. In another embodiment, the control may be provided by enabling the period of inactivity after which access is denied to be controlled. In yet another embodiment, techniques may be provided for enabling isolation of applications for a session.

In certain embodiments, techniques (including a method, system, and computer readable-memory storing instructions executable by one or more processors) are provided for controlling access to a protected resource. A configurable time value may be provided for a session, where the configurable time value specifies a period of time following a last successful authentication in the session using a credential before the credential needs to be re-authenticated for the session. A user session in which a user is authenticated to access the protected resource may be monitored. The monitoring may comprise determining a period of time since the last successful authentication of the user in the user session. Upon determining that the period of time since the last successful authentication of the user in the user session exceeds or equals the configurable time value, the user may be denied access to the protected resource in the user session until the user is re-authenticated.

In certain embodiments, techniques (including a method, system, and computer readable-memory storing instructions executable by one or more processors) are provided for controlling access to a protected resource. A configurable time value for a session may be provided, where the configurable time value specifies a period of time that the session remains active. A user session may be monitored to determine a period of time the user session is active. Various actions may be performed upon determining that the period of time the user session is active exceeds the configurable time value. In one embodiment, the actions may include denying the user access to the protected resource in the user session and causing the user session to expire. A new session for the user is opened and the user granted access to the protected resource upon re-authentication of the user.

In certain embodiments, techniques (including a method, system, and computer readable-memory storing instructions executable by one or more processors) are provided for controlling access to a protected resource. A configurable time value for a session for an application may be provided, wherein the configurable time value specifies a period of time that a session for the application remains active without accessing the protected resource. A user session for the application may be monitored to determine a period of time the user session for the application is active without the protected resource being accessed. Upon determining that the period of time the user session for the application is active without the protected resource being accessed exceeds the configurable time value, the user session for the application is entered into an idle state wherein the user is denied access to the protected resource until the user is re-authenticated in the user session for the application.

DETAILED DESCRIPTION OF THE INVENTION

Figure 1:
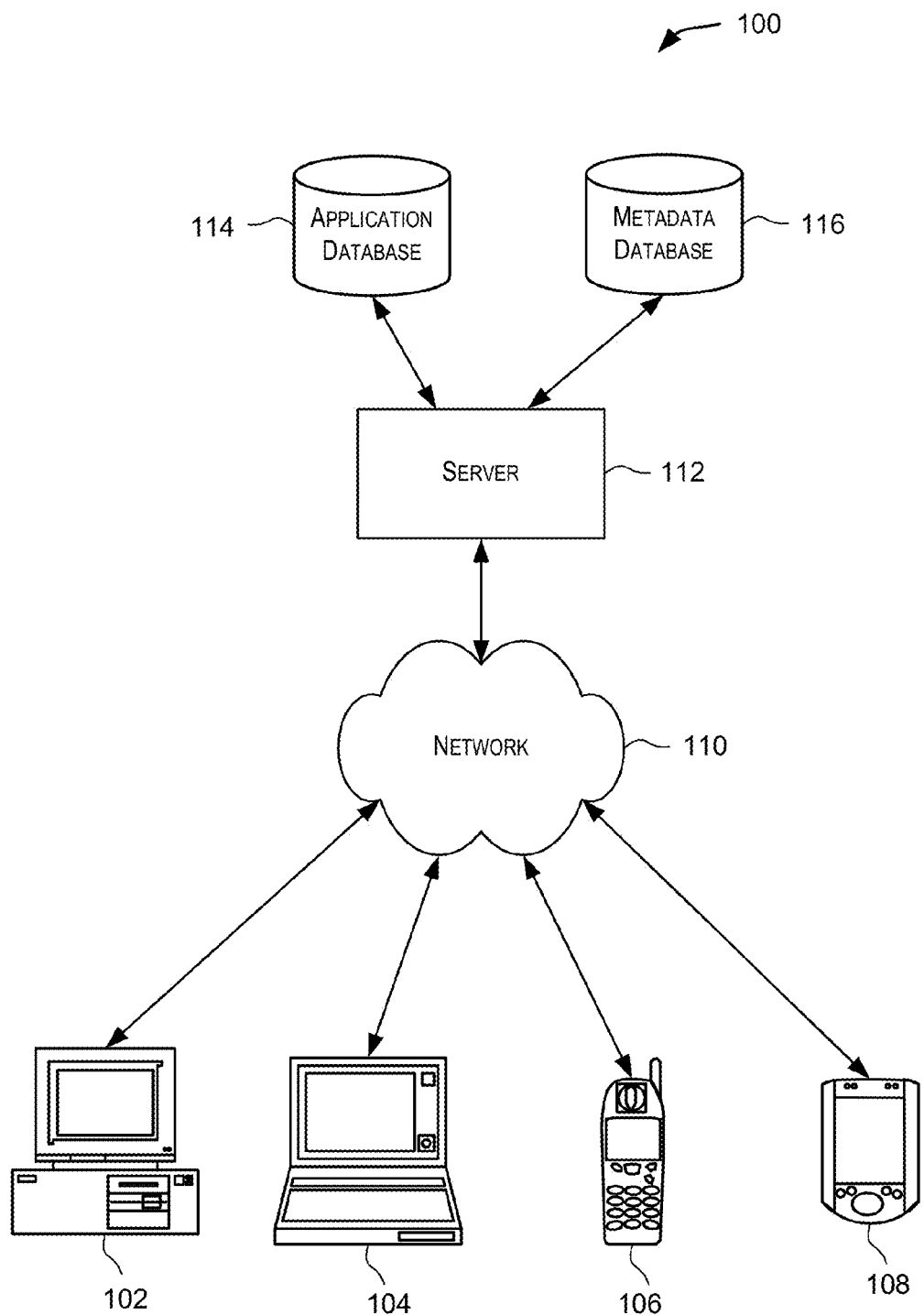
FIG. 1 is a simplified block diagram illustrating components of a system environment that may be used in accordance with some embodiments of the present invention.

In the following description, for the purposes of explanation, specific details are set forth in order to provide a thorough understanding of certain embodiments of the invention. However, it will be apparent that various embodiments may be practiced without these specific details. The figures and description are not intended to be restrictive.

Certain embodiments of the present invention provide techniques that enable finer grained user authentication and activity control.

Certain embodiments relate to and are concerned with:
a) the validity period after which credentials need to be provided anew or access is denied,
b) the period of inactivity after which access is denied, and/or
c) the isolation of applications, such that the fact that (a) and (b) may both be satisfied for the session in general is still insufficient for access.

In one embodiment, the finer grained control may be in the form of controlling the validity period after which credentials need to be provided anew or access is denied. In another embodiment, the control may be provided by enabling the period of inactivity after which access is denied to be controlled. In yet another embodiment, techniques may be provided for enabling isolation of applications for a session.

In certain embodiments, techniques (including a method, system, and computer readable-memory storing instructions executable by one or more processors) are provided for controlling access to a protected resource. A configurable time value may be provided for a session, where the configurable time value specifies a period of time following a last successful authentication in the session using a credential before the credential needs to be re-authenticated for the session. A user session in which a user is authenticated to access the protected resource may be monitored. The monitoring may comprise determining a period of time since the last successful authentication of the user in the user session. Upon determining that the period of time since the last successful authentication of the user in the user session exceeds or equals the configurable time value, the user may be denied access to the protected resource in the user session until the user is re-authenticated.

In certain embodiments, techniques (including a method, system, and computer readable-memory storing instructions executable by one or more processors) are provided for controlling access to a protected resource. A configurable time value for a session may be provided, where the configurable time value specifies a period of time that the session remains active. A user session may be monitored to determine a period of time the user session is active. Various actions may be performed upon determining that the period of time the user session is active exceeds the configurable time value. In one embodiment, the actions may include denying the user access to the protected resource in the user session and causing the user session to expire. A new session for the user is opened and the user granted access to the protected resource upon re-authentication of the user.

In certain embodiments, techniques (including a method, system, and computer readable-memory storing instructions executable by one or more processors) are provided for controlling access to a protected resource. A configurable time value for a session for an application may be provided, wherein the configurable time value specifies a period of time that a session for the application remains active without accessing the protected resource. A user session for the application may be monitored to determine a period of time the user session for the application is active without the protected resource being accessed. Upon determining that the period of time the user session for the application is active without the protected resource being accessed exceeds the configurable time value, the user session for the application is entered into an idle state wherein the user is denied access to the protected resource until the user is re-authenticated in the user session for the application.

Certain embodiments of the invention add additional state tracking of both authentication and activity timings, the concept of a domain group under which a set of these timings are isolated from other application access made using the session, and enforcement on a per-application basis which makes use of this data. The resulting session state, as a given authorization attempt sees it, may be different from that seen by an attempt made of a different application. Additionally, because the set of attributes present within a session may build up over time and a series of application accesses, it is not desirable to lose this information when re-authentication is required, so the session itself is maintained through any such re-authentication flow; no data is lost.

Certain embodiments of the present invention greatly improve user experience as compared to conventional solutions. In one embodiment, enforcement is applied per-access, but the effect the user sees is also per-access; the user can be denied access to application A in a browser tab, and presented with a login form to re-authenticate, while happily continuing to access application B in a separate tab. The user's session is not terminated unexpectedly at the first denial. The user may never even realize that both applications are making use of a single SSO (single sign-on) session.

Administration experience is improved as a single SSO deployment can be used in meeting the differing needs of all protected applications. Further, to use the example above, applications A and B can both share and consume state using that session's attributes, something not possible if they were protected using two product deployments (and hence one session created by each).

In one embodiment, domain groups are added to enforce domain isolation with respect to authentication. An idle timeout is tracked on a per-domain group (or domain, if domain not in a group) basis. Credential validity is tracked on a per-domain group (or global, if domain not in a group) basis. Both are enforced on a per-domain basis.

The functionality described in this disclosure may apply to and be used by any WAM product.

Various embodiments described above may be implemented only in hardware, or only in software, or using combinations thereof. The various processes described herein can be implemented on the same processor or different processors in any combination, with each processor having one or more cores. Accordingly, where components or modules are described as being adapted to or configured to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. The various embodiments are not restricted to operation within certain specific data processing environments, but are free to operate within a plurality of data processing environments. Additionally, although embodiments have been described using a particular series of transactions, this is not intended to be limiting.

FIG. 1 is a simplified block diagram illustrating components of a system environment 100 that may be used in accordance with some embodiments of the present invention. As shown, system environment 100 includes one or more client computing devices 102, 104, 106, 108, which are configured to operate a client application such as a web browser, proprietary client (e.g., Oracle Forms), or the like. In various embodiments, client computing devices 102, 104, 106, and 108 may interact with a server 112.

Client computing devices 102, 104, 106, 108 may be general purpose personal computers (including, by way of example, personal computers and/or laptop computers running various versions of Microsoft Windows and/or Apple Macintosh operating systems), cell phones or PDAs (running software such as Apple iOS, Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 102, 104, 106, and 108 may be any other electronic device, such as a thin-client computer, Internet-enabled gaming system, and/or personal messaging device, capable of communicating over a network (e.g., network 110 described below). Although system environment 100 is shown with four client computing devices, any number of client computing devices may be supported. Other devices such as devices with sensors, etc. may interact with server 112. Authentication requests may be received from one or more client devices.

System environment 100 may include a network 110. Network 110 may be any type of network familiar to those skilled in the art that can support data communications using any of a variety of commercially-available protocols, including without limitation TCP/IP, SNA, IPX, AppleTalk, and the like. Merely by way of example, network 110 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 100 also includes one or more server computers 112 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to an access management system as described above.

Server 112 may run an operating system including any of those discussed above, as well as any commercially available server operating system. Server 112 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 100 may also include one or more databases 114, 116. Databases 114, 116 may reside in a variety of locations. By way of example, one or more of databases 114, 116 may reside on a storage medium local to (and/or resident in) server 112. Alternatively, databases 114, 116 may be remote from server 112, and in communication with server 112 via a network-based or dedicated connection. In one set of embodiments, databases 114, 116 may reside in a storage-area network (SAN) familiar to those skilled in the art. Similarly, any necessary files for performing the functions attributed to server 112 may be stored locally on server 112 and/or remotely, as appropriate. In one set of embodiments, databases 114, 116 may include relational databases, including various versions of databases provided by Oracle Corporation, which are adapted to store, update, and retrieve data in response to SQL-formatted and other commands. In one embodiment, policies configured to controlling a set of resources may be stored by one of the databases.

Figure 2:
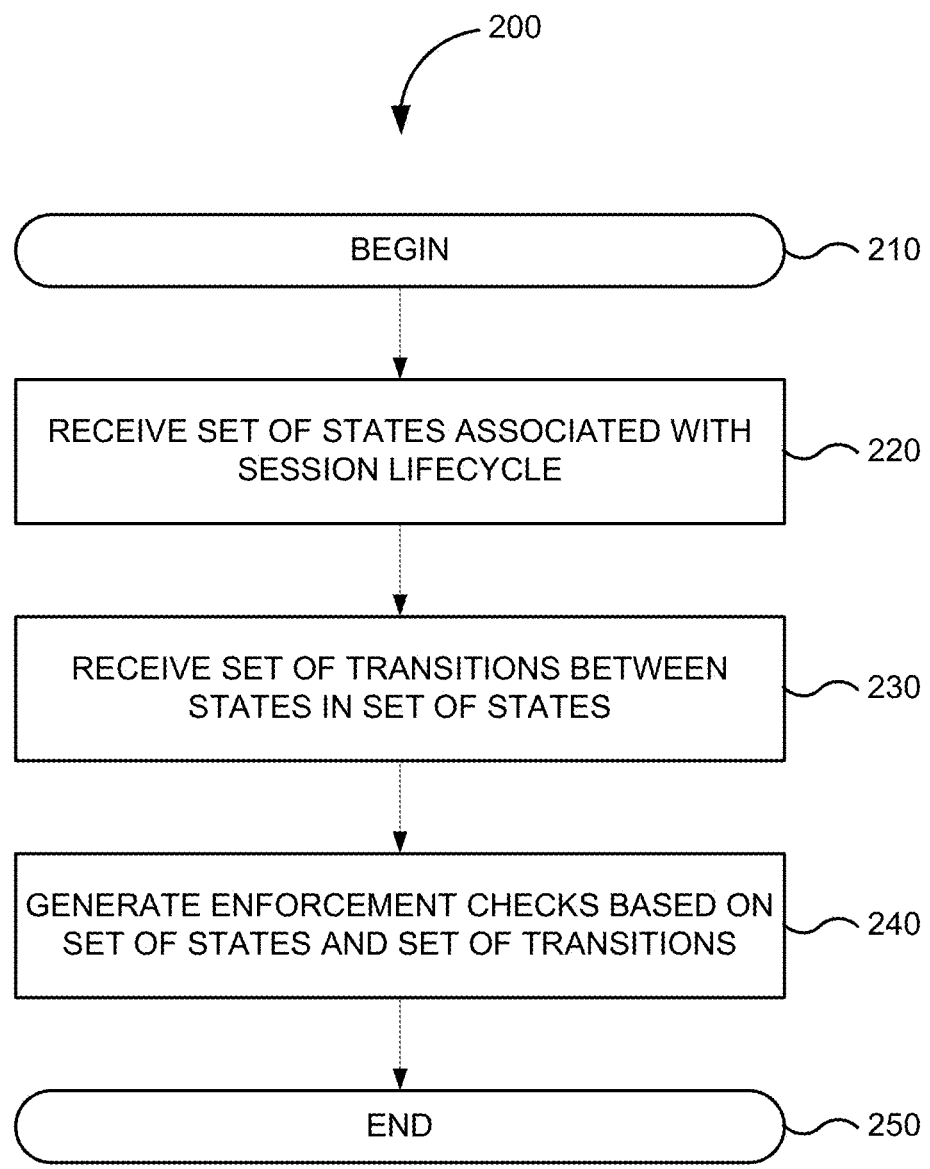
FIG. 2 is a flowchart of a method for controlling a set of resources in one embodiment according to the present invention.

FIG. 2 is a flowchart of method 200 for controlling a set of resources in one embodiment according to the present invention. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a set of states associated with a session lifecycle is received. In step 230, a set of transitions between states in set of states is received. In step 240, enforcement checks are generated based on set of states and set of transitions.

In various embodiments, an Access Manager session is created during authentication and is bound to both a user and the client with which they have authenticated. The Access Manager session lifecycle consists of state transitions for session creation, updates, idleness, and expiration. Access Manager sessions can be maintained within one or more Access Manager Server (such as Oracle Access Manager provide by Oracle of Redwood Shores, Calif.) to provide tracking and policy enforcement for a given session's lifecycle (performed either manually by an Administrator and using automated flows).

In one aspect, a session lifecycle refers to a set of states with defined transitions from one state to another that depend on user activity (or lack thereof), and manual (or automated) Administrator activity. Administrators can define the following global session lifecycle settings: Session Lifetime, Idle Timeout, Credential Lifetime, Maximum number of Sessions, Database Persistence of Active Sessions, or the like. Session lifecycle states include those in Table 1.

TABLE 1

| State | Description |
|---|---|
| Active | Newly-created sessions are active. A session is created when the user is authenticated by Access Manager. The session remains active until Access Manager determines that the session must transition into one of the other states in this table. Note: In certain embodiments, Administrators can delete only active sessions. |
| Idle | An active session becomes idle when the user does not access Access Manager-protected content for the period defined by an Administrator. When an active session becomes idle, the user must re-authenticate to proceed. When re-authentication is successful, the session returns to the Active state; session attribute values are preserved through this process. |

TABLE 1-continued

| State | Description |
|---|---|
| Credential Expired | A user's credential expires when the time since the applicable successful authentication exceeds the defined credential lifetime.<br>When an active credential expires, the user must re-authenticate to proceed. When re-authentication is successful, the session returns to the Active state; session attribute values are preserved through this process. |
| Expired | An active session expires when the duration of the session exceeds the defined lifetime. An expired session is completely inaccessible and eligible for deletion. When an active session expires, the user must re-authenticate to proceed. When re-authentication is successful, a new session is created; however, session attribute values are not preserved (as they are for Idle and Credential Expired states). |

In one aspect, each session can include the following attributes, which are compared for session enforcement: Session creation time, Last access time, Last authentication time. Table 2 describes the session checks that are performed using these attributes.

TABLE 2

| Session Check | Description |
|---|---|
| Is the Session Idle? | Compares the last access time against the configured Idle Timeout value. Exceeding the configured period triggers a change from the Active to the Idle state. |
| Is the Session Expired? | Compares the session creation time against the configured Session Lifetime. Exceeding the configured period triggers a change from the Active to the Expired state. |
| Is the Credential Expired? | Compares the last authentication time against the configured Credential Lifetime. Exceeding the configured period triggers a change from the Active to the Credential Expired state. |

During state transitions to the Idle or Credential Expired state, underlying session attributes are preserved because the user previously satisfied authentication criteria and her data is trusted. However, continued access to protected resources based on that session, and resulting modification of data within that session, is not allowed until the user re-authenticates and proves she is who she says she is (and is not a malicious user with access to an unlocked computer.

A session can be removed by any of the actions described in Table 3.

TABLE 3

| Action | Description |
|---|---|
| Expiration | Expired sessions are eligible for removal based on their creation time. Actual removal is determined by the storage mechanism. The session is removed from the distributed cache using a background task running on the server; it is removed from the database using a similar background task, an optionally-enabled job within the database itself, or both methods in combination.<br>Once a session has been deleted from storage on all tiers (local and distributed caches, and from the database if enabled), the session is removed. |
| User Logout | User Logout triggers immediate removal from the distributed cache, subject to present volume of DB session writes and performance. |
| Termination | Termination is identical to user log out whether the session is interactively terminated through the console or in an automated way--as part of an Oracle Identity Management user lockout or de-provisioning flow. |

On occasion, multiple forms of authentication are required and performed within a single session to complete a step-up flow. In the step-up flow, a user authenticates to access protected content. Later in the same session, the user requests other more sensitive content and is required to authenticate to gain access at a more stringent level. In this case: multiple authentications always occur in order of the increasing authentication level and the highest-level credential is always the last to expire. Each session holds the following attributes for step-up authentication enforcement: Last authentication time, Credential lifetime and Authentication Level. Once a session is in a Credential Expired state, re-authentication is required on the first access to a protected resource following the expiration. This re-authentication is not needed for the highest level the session had achieved, only for the level that is needed to access the content in question. If the re-Authentication Level is less than that previously contained in the session before credentials expired, then the user has completed a step-down process. Upon successful re-authentication, the session is restored to the Active state with an Authentication Level that is equal to the level of the authentication scheme used.

In various embodiments Access Manager enforces limitations on user access to resources in a more granular way than is possible with a single set of global session timings, or single set of authentication schemes in which access depends solely on a single authentication level. Specialized access can take the following forms:

Access to certain data has more stringent requirements, while access to all other data is configured globally. For example, a specific financial reporting application requires that re-authentication must be performed every hour to meet regulatory requirements. However, it would be unreasonable to force this burden onto all users, for all Access Manager-protected application access.

Protection applied to the data is non-transitive. An Active session applicable to the deployment generally is not itself sufficient to gain access. Even if the generalized authentication level present in the session is sufficient, additional authentication is required. For example, an application might (again for compliance reasons), require that credentials be validated at the time of first access to that application specifically, regardless of the user's authenticated status as Access Manager sees it.

Both specialized access and non-transitory requirements might need to be applied simultaneously for the protection of a given application.

Administrators can choose to override a subset of the global session settings on a per-application basis. Session settings for access to resources within one or more application domains are isolated from the global session settings that apply to all resources and sessions in the deployment. Optional application-specific session configuration provides:

The ability to declare session idle timings on a per-application basis, which is generally more stringent than the global idle timing defined within the deployment as a whole.

The ability to require the user to re-authenticate after a per-application session lifetime is exceeded.

The application of specific session configuration overrides to one or more Application Domains within the defined group.

Figure 3:
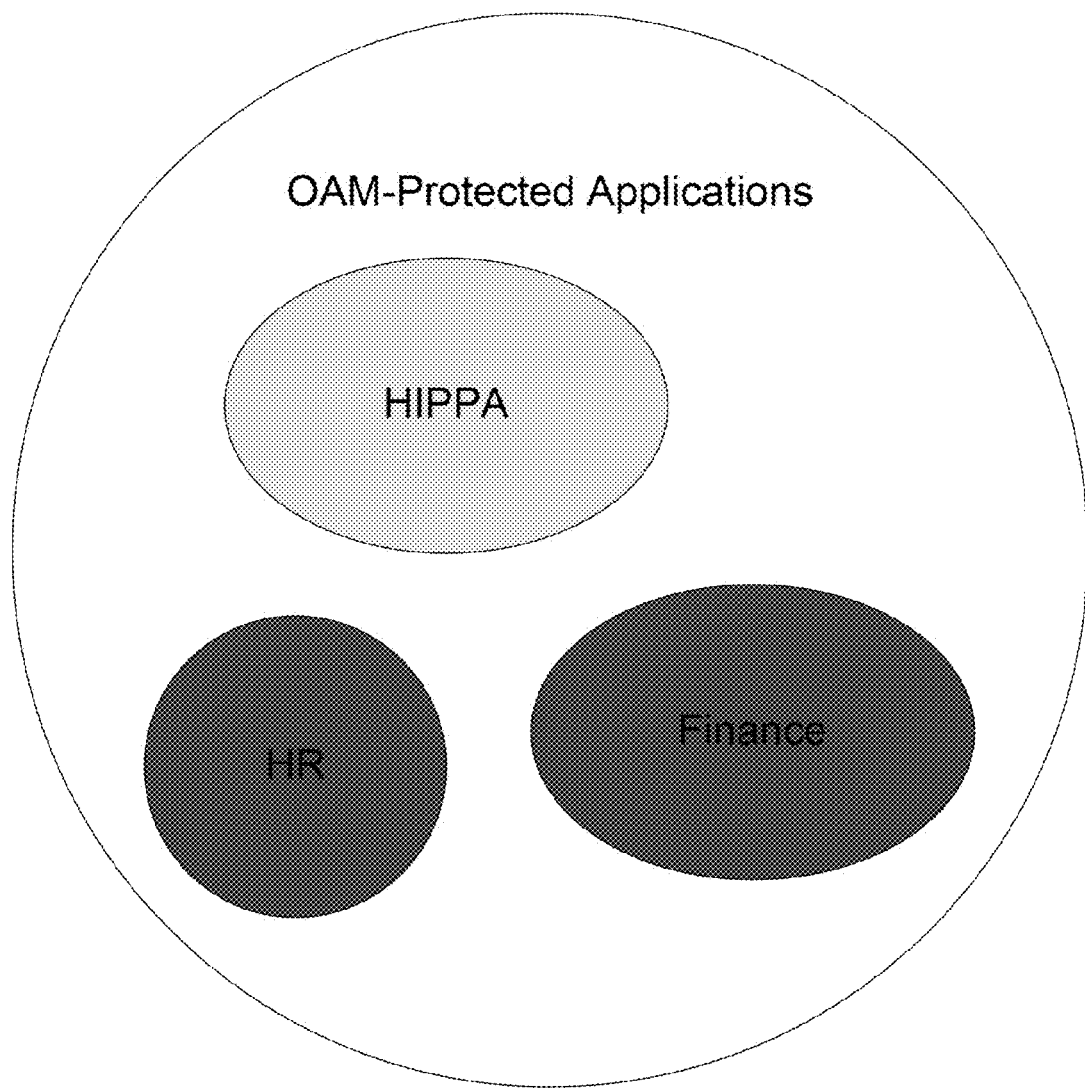
FIG. 3 is an illustration of a set of resource for which fine-grained control may be required.

FIG. 3 is an illustration of a set of resource for which fine-grained control may be required. Table 4 describes session enforcement when you have defined Application Domain-specific overrides to global session settings

TABLE 4

| | |
|---|---|
| Is the Session Idle? | Compares the last access time against the configured Idle Timeout value for the defined Application Domain group only. Exceeding the configured period triggers a change from the Active to the Idle state. |
| Is the Session Expired? | Compares the session creation time against the configured Session Lifetime. Exceeding the configured period triggers a change from the Active to the Expired state for the defined Application Domain group only. |
| Is the Credential Expired? | Compares the last authentication time against the configured Credential Lifetime. Exceeding the configured period triggers a change from the Active to the Credential Expired state for the defined Application Domain group only. |

Accordingly, satisfying an authentication scheme of a given level provides access to all resources protected at lower levels. All schemes of a given level are viewed as equivalent. The following provides a simple example based on a single authentication scheme used in two application domains as well as a more complex example based on multiple authentication schemes in two application domains.

In a single authentication scheme, both the correct contents of a session, and the correct access decision made at any point, can involve subtleties based on both inputs and pre-existing context. For example, consider the following configuration with Table 5 showing the outcome:

A single authentication scheme (S1) defined using Level 2
Application domains D1 and D2
All resources within each domain are protected with a single authentication policy, which uses S1, and a single authorization policy.
Global Session Configuration:
Session Lifetime: 90 minutes
Idle Session Timeout: 0 (session never idles out)
Credential Lifetime: 30 minutes

TABLE 5

| Time (Delta) | Action | Allowed or Denied | Reason | Session Content |
|---|---|---|---|---|
| 0 | Access to D1 | Denied | No session | null |
| 1 | Authentication with S1 and Access to D1 | Allowed | Authentication scheme satisfied | Level 2, authentication time 1 |
| 21 | Access to D2 | Allowed | | Level 2, authentication time 1 |
| 66 | Access to D1 | Denied | Credentials expired | Level 2, authentication time 1 |
| 67 | Authentication with S1 and Acces sto D1 and D2 | Both Allowed | Authentication scheme satisfied | Level 2, authentication time 67 |

A session typically could only have its authentication level reduced in the context of an Identity Management integration self-service flow (such as forced password reset). Upon entering this state, the user continued to be authenticated with a level of 1 (less than any out of the box authentication scheme). The user could not access any resources protected with these schemes until they completed the flow.

In certain embodiments of the invention, step-down occurs when credentials expire as a matter of course—until the user happens to provide new credentials that satisfy a scheme of the same level as the maximum held by the session previously. Otherwise, from the authentication perspective, it is as if the session is new and further step-up is required.

Consider the same example with two schemes (for step-up and step-down with the addition of credential expiry) with Table 6 showing the outcome:

Authentication schemes S1 (Level 2) and S2 (Level 3)
Application domains D1 and D2
All resources within each domain are protected with a single authentication policy, and a single authorization policy
D1 uses S1; D2 uses S2
Global Session Configuration:
Session Lifetime: 60 minutes
Idle Session Timeout: 0 (session never idles out)
Credential Lifetime: 30 minutes

TABLE 6

| Time (Delta) | Action | Allowed or Denied | Reason | Session Content |
|---|---|---|---|---|
| 0 | Access to D1 | Denied | No session | null |
| 1 | Authentication with S1 and Access to D1 | Allowed | Authentication scheme satisfied | Level 2, authentication time 1 |
| 12 | Access to D2 | Denied | Level too low | Level 2, authentication time 1 |
| 13 | Authentication with S2 and Access to D2 | Allowed | Step Up Authentication | Level 3, authentication time 13 |

TABLE 6-continued

| Time (Delta) | Action | Allowed or Denied | Reason | Session Content |
|---|---|---|---|---|
| 32 | Authentication with S1 and Access to D1 and D2 | Both Allowed | Credentials supersede those for S1, replacing S1 in the session; S2 credentials not yet expired | Level 3, authentication time 13 |
| 50 | Access to D1 and D2 (different browser tabs) | Both Denied | S2 credentials expired | Level 3, authentication time 13 |
| 51 | Authentication with S1 and Access to D1 | Allowed | Level 2 scheme satisfied; resulting level of the now (again) active session is less than previously | Level 2, authentication time 51 |
| 52 | Access to D2 | Denied | Session no longer at level 3 | Level 2, authentication time 51 |

Accordingly, session lifecycle settings can be defined using a Management Console. In various aspects, when either global or application-specific session lifecycle settings are defined, any timing interval set to 0 cancels the corresponding check. For example if idle timeout is set to 0, sessions never idle out. With a session lifetime of 0, sessions never expire. A credential expiration of 0 disables the credential validity check. In all cases, applicable data is tracked and updated in the session, just as if it is being checked on a per-request basis.

Application-specific access is tracked from the initial application-access time and is updated only as further requests are made of that application. In other words, the user's authentication and the authentication state are under control of Access Manager and the Administrator. The current idle time for a given application is shared between Access Manager and the application. The application provisions its own run time data for the user on a per-session basis and needs to remove it as soon as possible to make room for others.

In one aspect, session semantics can be more fine-grained, in that some applications are seen as needing more security-sensitive than others. Such applications need to enforce stricter requirements around idling out and requiring continued re-authentication of the user before they can proceed with using that app in particular. This is at least partially driven not by their own wants, but by industry-specific compliance requirements. Simultaneously, it is desired that certain session and authentication enforcement semantics be made more flexible, to properly support new use cases and expected levels of performance from session management.

Therefore, an ability is provided to introduce one or more configuration parameters by which per-domain timing overrides can be enabled or disabled. In some deployments, the security administrator may not, as a compliance matter, be allowed to delegate these timing decisions to a policy admin, even if they are limited by our design to making access more restrictive than is enforced globally and not less. This is used in conjunction with delegated administration functionality.

In further embodiments, enablement of domain group functionality is provided. This enables the security administrator to control grouping. A permission is provided which lets the security admin delegate to another admin an ability to set session timings for a domain or domain group which are less stringent than the global defaults.

In one embodiment, newly-created sessions are valid. In another embodiment, subject to a configurable idle timeout value, a session may become idle. In this state, re-authentication is generally required to proceed, and if this authentication succeeds a new session is created, and existing contents not preserved. In one example, a default idle timeout value is 15 minutes; if set to 0, sessions never become idle.

In some embodiments, a special call for "session resurrection" is provided such that if a request comes in for a user whose session is idle, and they present the proper mod_osso state-tracking cookie, and that indicates that the user was not actually idle (rather, was accessing only mod_osso protected resources, and the server of course did not know this), then the session's state will be reset to valid.

In another aspect, subject to a configurable session lifetime, a session may become expired. In this state the session is completely inaccessible to other components and effectively removed. The user will need to re-authenticate in order to proceed, and a new session will be created for them if that succeeds. In one example, a default expiry time is 8 hours; if set to 0, sessions never expire.

In yet another aspect, there are three ways in which a session can be removed. First, a session may have become expired. In this case it is not immediately removed, but rather it has made eligible for removal based on the timestamps involved. Actual deletion of such sessions happens as determined by the storage mechanism, and in the DB case configuration around that (a thread running on the server or a scheduled DB job can be used, or both in combination). Once a session has been deleted from storage at all tiers (local and distributed caches, and from DB if enabled), the session is removed.

Second, if the user logs out, their session is immediately removed from the distributed cache, and the session ID put on a queue to be purged from the DB (if enabled) via a frequently-run bathed query. Third, if a user is administratively terminated, whether interactively via UI or in an automated way (for example, as part of an OIM user lockout or de-provisioning flow). The action taken here is identical to the logout case.

In further embodiments, a new state may be introduced, that of credential expired. Subject to a configurable time value (same as the idle and overall expiration intervals), a session may go into this state. When it does, the underlying session contents are still valid, as the user previously satisfied authentication criteria and their data is trustable. However, continued access to protected resources based on that session, and resulting modification of data within that session, will not be allowed until re-authentication occurs (i.e. prove to us you are still who we believe you are, and that someone malicious has not walked up to your unlocked PC and starting clicking things). When that completes successfully, the session is again valid. The session internally will store the time of last authentication, as it already does the time of last access, and this timestamp will be refreshed each time authentication occurs.

Sometimes multiple forms of authentication have been performed within a single session to complete a step-up flow, in which one authenticates to access protected content, then at some point is made to again in order to access certain other, more sensitive content; to date this always has meant with a "stronger authentication factor" (meaning a scheme with a higher resulting authentication level; the actual credentials used are irrelevant). Thus, multiple authentications always occur in increasing-level order, and so as it relates to the new session state, and the level achieved for this session overall, the credential of the greatest level would always be the last to expire.

In one embodiment, once the session is in a credential expired state, re-authentication will be required on first access to protected resources post-expiration. The authentication required will not be that needed for the highest level the session had achieved, but only whatever is necessary in order to access the content in question. On success, the session will be restored to the valid state, with a level equally that of the scheme used. This may be a "step down" in level from what the session had held before credentials expired; if the user then attempts access to content which is protected at a higher than that (for example, whatever application required the highest level of access achieved pre-expiration), then step-up authentication will occur, in the same way that it happened the first time for the session. Therefore, this represents the least deviation from existing logic and user experience.

In one embodiment, session contents should still be considered valid in the scenarios above, including
Attributes set via previous policy evaluation
Attributes set via flows involving other IDM products, which may well be one-time and not repeatable.

In other words, the fact that an expiry time can be set on credentials does not imply that we should throw other session data out as well. Therefore, if the ability for more frequent, and arbitrary (from the perspective of session contents) authentication is added, these contents are preserved through such a flow. Thus, post-reauthentication in both the idled out and credential expiration cases, the existing session will be restored to a valid state and used in subsequent requests. This contrasts with removing the session and creating a new one in the idle timeout case. The intent being that sessions be restored and not removed.

In various embodiments, a new globally-applicable session state and configurability is provided that for the ability to override a subset on a per-domain basis. Access to a set of domains can be isolated from the rest of the deployment, and from other such sets which may exist within the deployment. The Access Manager enforces limitations on user access to resources, in a more granular and isolating way than is possible with:
A single set of session timings.
A single continuum of authentication schemes, in which satisfaction for a given application access is dependent solely on a single level value, satisfying a scheme of a given level provides access to all resources protected at lower levels, and all schemes of a given level are viewed as equivalent.

In other words, a single OAM deployment should be able to handle both generalized data (read: applications) accessible by all members of an organization, subject to various rules and conditions already available within authorization policies, but also compartmentalized sets of data which require specialized access to meet compliance requirements, align with behavior of the protected application (for example, in the area of session management), or for other reasons. Such need for specialized access can take several different forms:
1. Access to the data requires that more stringent requirements be met; that re-authentication be performed when not needed generally in the deployment, or done more often than needed generally, or that user activity be tracked more tightly than needed generally. All of these should be as relates to access to the data in particular, while access to all other data continues as globally configured.
2. Protection applied to the data be non-transitive, meaning that having a valid session applicable to the deployment generally is not itself sufficient to gain access; even if the generalized authentication level present in the session would be sufficient, additional authentication is required regardless. And this should hold when applied both between the generalized data and a compartment holding special data, but between compartments.
3. Finally, that both the specialized access and non-transitory requirements may need to be applied for the protection of a given application simultaneously. So the way in which we satisfy each requirement cannot occasion conflicts or incompatibility.

Figure 4:
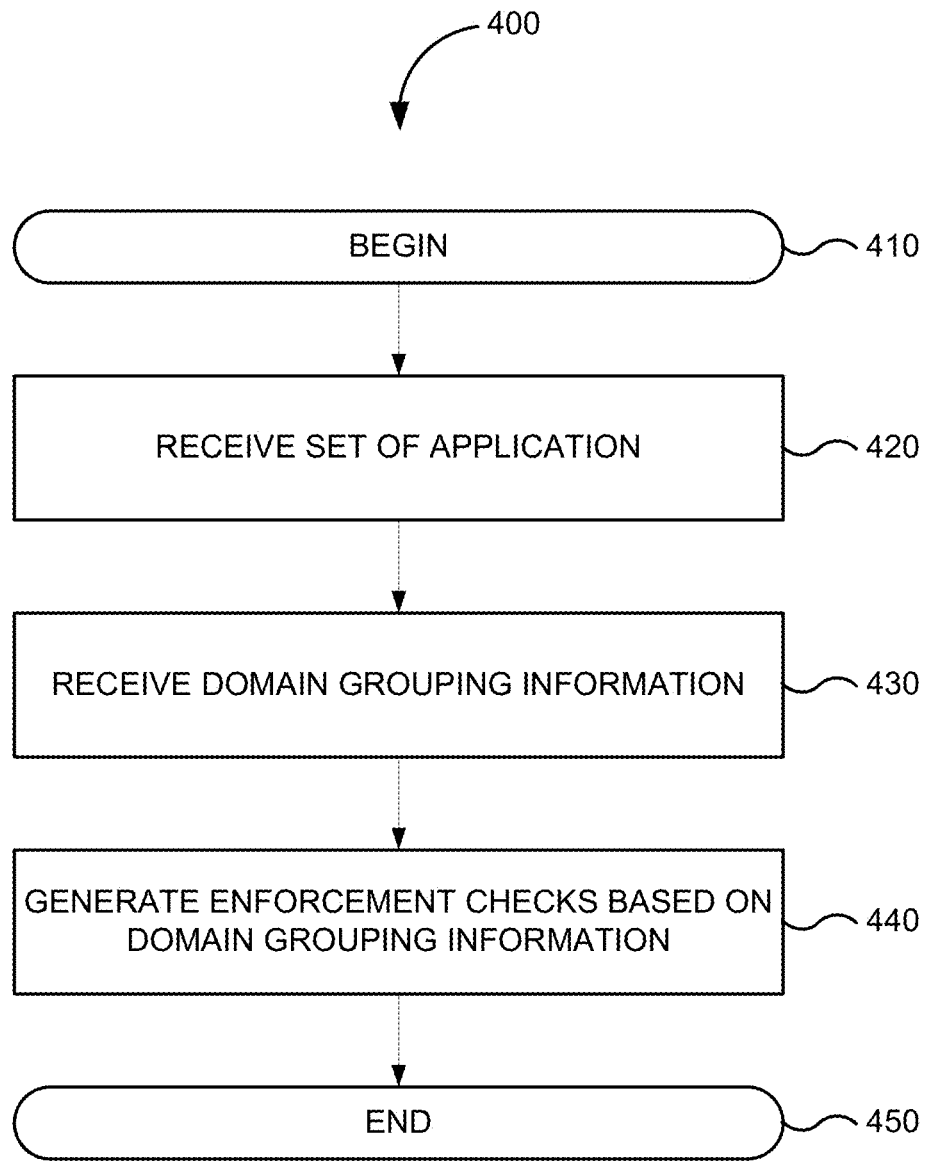
FIG. 4 is a flowchart of a method for controlling a set of resources according to domain groups in one embodiment according to the present invention.

FIG. 4 is a flowchart of method 400 for controlling a set of resources according to domain groups in one embodiment according to the present invention. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a set of applications is received. In step 430, domain grouping information is received. In step 440, enforcement checks are generated based on the domain grouping information. FIG. 4 ends in step 450.

In one aspect, idle timeout and credential expiration intervals will be exposed at a per-domain level. Both, either, or neither can be overridden for a given application domain. If overridden, the value(s) set must be less than or equal to the equivalents set on the global basis (else they are nonsensical as they will never have effect).

Assume that a given authorization request is made, for a resource which is matched to a resource pattern and authorization policy in a domain which contains specific session timings. Instead of simply evaluating the user's session activity against the globally-applicable timings, the Access Manager verifies the following.
1. That the last authentication time falls within not only the globally-configured credential expiration interval, but also the per-domain interval. It is assumed that the domain's value is stricter, but as stated above we are not going to prevent this via admin-time validation, so we must check against both.
2. That the last access time falls within not only the globally-configured idle timeout interval, but also the per-domain interval. The same caveat as for credential expiry applies here as well.

If either of these conditions do not hold for this authorization request, then this request will be denied, and the user will be directed to re-authenticate using the scheme protecting the resource being accessed.

If check (1) failed, any subsequent attempts to access resources protected by this domain will continue to be denied, with resulting browser redirect for authentication, until that scheme has been satisfied—this can be done either in the context of an access request for a resource in this domain, or in the context of a request for content within another domain protected by the same scheme.

If check (2) failed, any subsequent attempts to access resources protected by this domain will continue to be denied, with resulting browser redirect for authentication, until that scheme has been satisfied. Unlike the above, however, this can only be done in the context of an access resource in this domain.

Domain specific override—Idle timeout. A single "last access time" value is typically stored within the session. In order to enforce idleness on a per-domain basis, a new per-domain last access time field is added in which that can be held. This will be filled with the last access time for each of the subset of domains visited within the course of a session, on which a per-domain idle timeout override has been defined. This does not need to be done for domains on which an override has not been defined, as no checking would be done against such data.

Domain specific override—Credential expiration. A stricter interval is declared against which a check is made of the last authentication time present in the session against. But that single value held in the session is sufficient data to check against, so no new requirement therefore. The session is used to tell that it has a last authentication time of "now" for the lower level, in order to satisfy the application with strict timings. Because where a lower level authentication happens more recently that a higher-level one, for the reason of satisfying a given application/domain, the added information is stored and the current globally-applicable level of the session is exposed.

This added storage typically only needs be done in the case of lower-level authentication happening later than that of a higher level. In the standard step-up case, the second authentication is both later and of a higher level than the first one, and so supersedes it completely, thus a record of the first one is useless and can be removed.

The above provides functionality for enforcing tighter access timings on applications within domain groups. In further embodiments, a mechanism is provided for a way to compartmentalize each group of apps from generalized application access and from each other.

Figure 5:
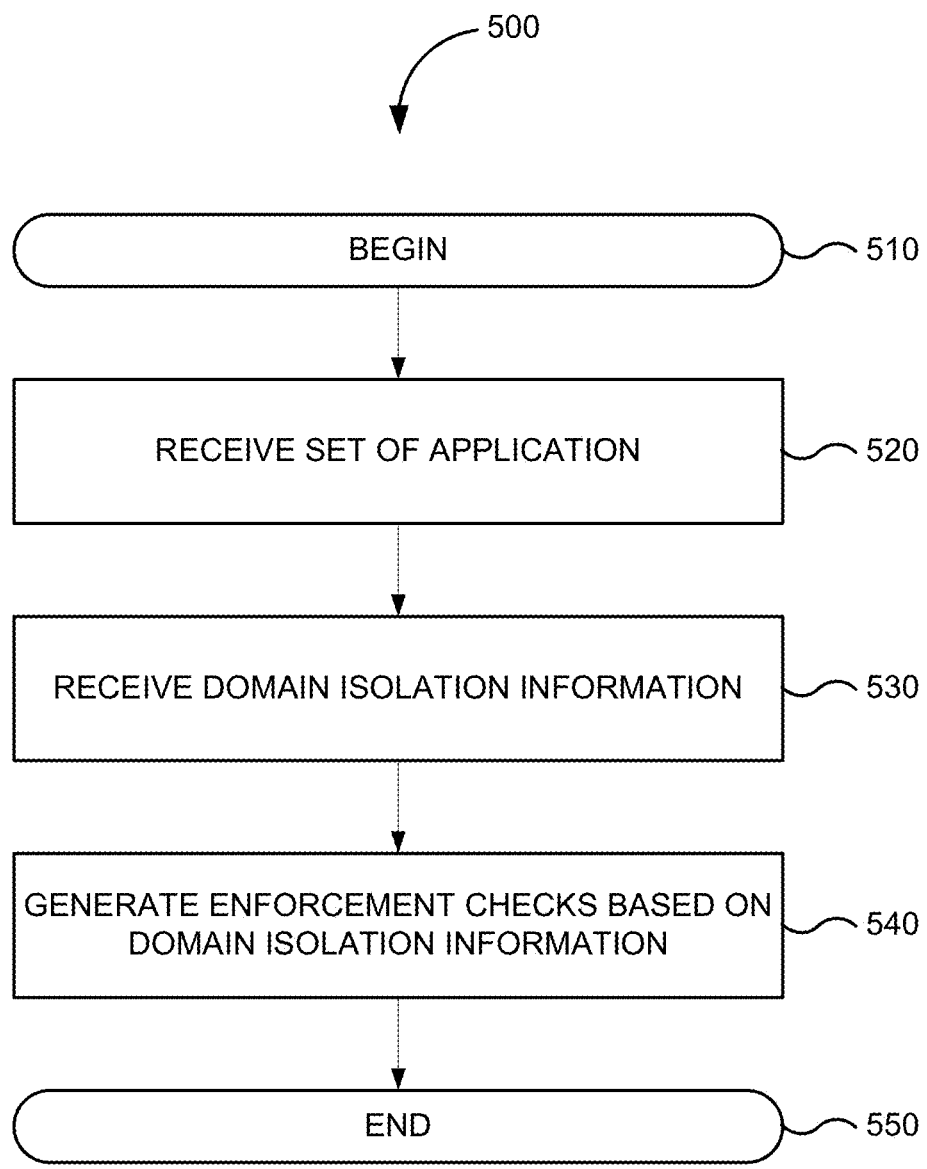
FIG. 5 is a flowchart of a method for controlling a set of resources according to domain groups in one embodiment according to the present invention.

FIG. 5 is a flowchart of a method for controlling a set of resources according to domain groups in one embodiment according to the present invention. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, a set of applications is received. In step 530, domain isolation information is received. In step 540, enforcement checks are generated based on the domain isolation information. FIG. 5 ends in step 550.

Figure 6:
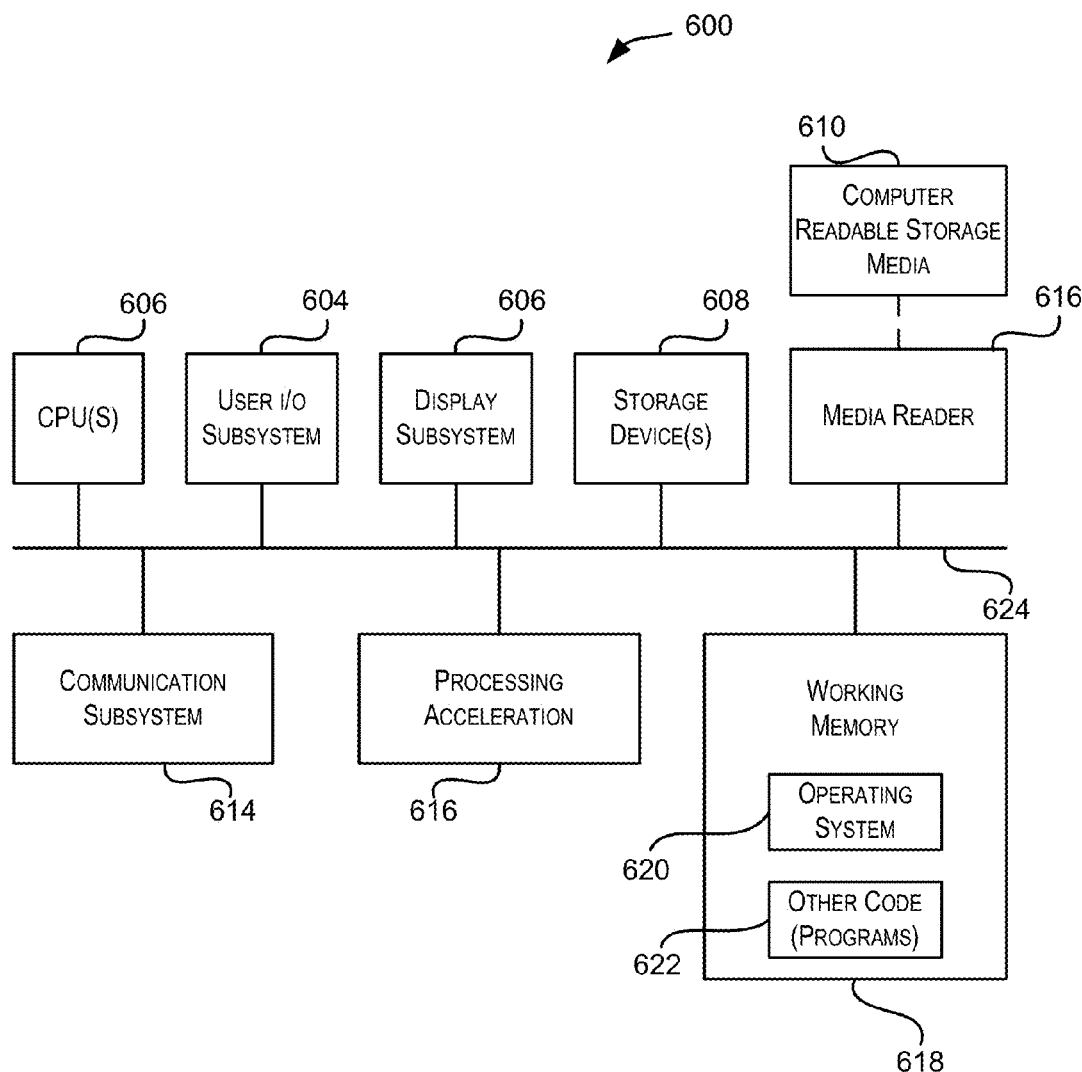
FIG. 6 is a simplified block diagram of a computing system that may be used in accordance with embodiments of the present invention.

FIG. 6 is a simplified block diagram of a computing system 600 that may be used in accordance with embodiments of the present invention. For example, authorization system 602 depicted in FIG. 6 may be adapted or configured to perform the various access management functions as described above. Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The CPUs may include single or multicore CPUs. Computer system 600 may also include one or more storage devices 608. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 may permit data to be exchanged with network 110 and/or any other computer described above with respect to system environment 100.

Computer system 600 may also comprise software elements, shown as being currently located within working memory 618, including an operating system 620 and/or other code 622, such as an application program (which may be a client application, Web browser, mid-tier application, RDBMS, etc.). In an exemplary embodiment, working memory 618 may include executable code and associated data structures such as memory structures used for performing access management of protected resources according to embodiments of the present invention. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Embodiments of the present invention may be conveniently implemented using one or more general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Certain embodiments of the present invention include a computer program product such as a computer-readable memory (e.g., a non-transitory storage medium or computer readable medium (media)) having instructions stored thereon/in which can be used to program a computer to perform any of the processes described above. The memory can be in various forms including but not limited to any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of memory or device suitable for storing instructions and/or data.

Thus, although specific invention embodiments have been described, these are not intended to be limiting. Various modifications and equivalents are within the scope of embodiments of the present invention.

What is claimed is:

1. A method of controlling access to a protected resource, the method comprising:
   at an access manager server having a hardware processor and a memory storing global session settings applicable to all resources and sessions in a first domain:
     receiving, a time value for server-side sessions maintained by the processor using a session lifecycle, the session lifecycle comprising creation, updates, idleness, and expiration, the server-side sessions configured with access to the protected resource when the protected resource is within a second domain, the time value comprising a period of time specific to the protected resource following a last successful authentication using a credential before the credential needs to be re-authenticated, the period of time specific to the protected resource overriding a subset of the global session settings in the memory on a per-resource or per-application basis;
     monitoring a user's server-side session maintained by the processor in the memory in which a user is authenticated to access the protected resource, the monitoring comprising determining, by the processor, a period of time since the last successful authentication of the user based on information stored in the user's server-side session;
     transitioning the user's server-side session from a first state in the session lifecycle to a second state in the session lifecycle based upon determining that the period of time since the last successful authentication of the user exceeds or equals the time value for the server-side sessions configured with access to the protected resource when the protected resource is within a second domain, the second state comprising an idle state or an expired state;
   generating, by the computer systems, information in the user's server side session in the memory denying the user access to the protected resource based on the second state until the user is re-authenticated.

2. The method of claim 1 further comprising providing a configurable time value for the server-side sessions specifying the period of time following the last successful authentication using the credential before the credential needs to be re-authenticated.

3. The method of claim 1 wherein receiving the time value for the server-side sessions comprises receiving a configurable time value specific to at least one domain group in a plurality of domain groups having access to the protected resource.

4. The method of claim 1 wherein receiving the time value for the server-side sessions comprises receiving a configurable time value that overrides a default configuration of at least one domain group in a plurality of domain groups having access to the protected resource.

5. The method of claim 1 wherein receiving the time value for the server-side sessions comprises receiving a configurable time value that isolates at least one domain group in a plurality of domain groups from other domain groups in a plurality of domain groups having access to the protected resource.

6. A method of controlling access to a protected resource, the method comprising:
   at an access manager server having a hardware processor and a memory storing a user session with access to the protected resource, the user session having a session lifecycle:
     receiving a configurable time value for sessions maintained by the processor with access to the protected resource when the protected resources is within a first domain, wherein the configurable time value specifies a period of time that the session remains active with respect to the protected resource when in the first domain that is independent of a period of time all sessions remain active with respect to the protected resource when in a second domain;
     monitoring the user session to determine a period of time the user session is active; and
   upon determining that the period of time the user session is active exceeds the configurable time value:
     denying the user access to the protected resource in the user session, causing the user session to expire thereby ending the session lifecycle, opening a new session for the user, and granting the user access to the protected resource in the new session upon re-authentication of the user; or
     denying the user access to the protected resource in the user session, causing the user session to enter an idle state in the session lifecycle, and granting the user access to the protected resource in the user session upon re-authentication of the user and transitioning the user session from the idle state to an active state in the session lifecycle.

7. A non-transitory computer-readable medium storing a computer program product which when executed by a hardware processor of a computer cause the processor to control access to a protected resource, the non-transitory computer-readable medium comprising:
   code that causes the processor to receive a time value for server-side sessions maintained by the processor using a session lifecycle, the session lifecycle comprising creation, updates, idleness, and expiration, the server-side sessions configured with access to the protected resource when the protected resource is within a second domain, the time value comprising a period of time specific to the protected resource following a last successful authentication using a credential before the credential needs to be re-authenticated, the period of time specific to the protected resource overriding a subset of global session settings in the memory on a per-resource or per-application basis;
   code that causes the processor to monitor a user's server-side session maintained by the processor in which a user is authenticated to access the protected resource, the monitoring comprising determining a period of time since the last successful authentication of the user based on information stored in the user's server-side session;
   code that causes the processor to transition the user's server-side session from a first state in the session lifecycle to a second state in the session lifecycle based upon determining that the period of time since the last successful authentication of the user exceeds or equals the time value for the server-side sessions configured with access to the protected resource when the protected resource is within a second domain, the second state comprising an idle state or an expired state;

code that causes the processor to generate information in the user's server side session denying the user access to the protected resource based on the second state until the user is re-authenticated.

8. The non-transitory computer-readable medium of claim 7 further comprising code that causes the processor to provide a configurable time value for the server-side sessions specifying the period of time following the last successful authentication using the credential before the credential needs to be re-authenticated.

9. The non-transitory computer-readable medium of claim 7 wherein the code that causes the processor to receive the time value for the server-side sessions comprises code that causes the processor to receive a configurable time value specific to at least one domain group in a plurality of domain groups having access to the protected resource.

10. The non-transitory computer-readable medium of claim 7 wherein the code that causes the processor to receive the time value for the server-side sessions comprises code that causes the processor to receive a configurable time value that overrides a default configuration of at least one domain group in a plurality of domain groups having access to the protected resource.

11. The non-transitory computer-readable medium of claim 7 wherein the code that causes the processor to receive the time value for the server-side sessions comprises code that causes the processor to receive a configurable time value that isolates at least one domain group in a plurality of domain groups from other domain groups in a plurality of domain groups having access to the protected resource.

12. The method of claim 6 further comprising receiving information for the configurable time value for the server-side sessions specifying the period of time following the last successful authentication using the credential before the credential needs to be re-authenticated.

13. The method of claim 6 wherein providing the configurable time value for the session comprises providing the configurable time value specific to at least one domain group in a plurality of domain groups having access to the protected resource.

14. The method of claim 6 wherein providing the configurable time value for the session comprises providing the configurable time value that overrides a default configuration of at least one domain group in a plurality of domain groups having access to the protected resource.

15. The method of claim 6 wherein providing the configurable time value for the session comprises providing the configurable time value that isolates at least one domain group in a plurality of domain groups from other domain groups in a plurality of domain groups having access to the protected resource.

* * * * *

UNITED STATES PATENT AND TRADEMARK OFFICE
CERTIFICATE OF CORRECTION

| | | |
|---|---|---|
| PATENT NO. | : 9,083,691 B2 | Page 1 of 1 |
| APPLICATION NO. | : 13/837040 | |
| DATED | : July 14, 2015 | |
| INVENTOR(S) | : Banford | |

It is certified that error appears in the above-identified patent and that said Letters Patent is hereby corrected as shown below:

In the specification

Column 10, line 23, delete "Acces sto" and insert -- Access to --, therefor.

In the claims

Column 17, line 22, Claim 1, delete "receiving," and insert -- receiving --, therefor.

Signed and Sealed this
First Day of March, 2016

Michelle K. Lee
*Director of the United States Patent and Trademark Office*